United States Patent

[11] 3,599,663

| [72] | Inventor | Burton Ver Nooy<br>Broken Arrow, Okla. |
|---|---|---|
| [21] | Appl. No. | 776,353 |
| [22] | Filed | Nov. 18, 1968 |
| [45] | Patented | Aug. 17, 1971 |
| [73] | Assignee | T. D. Williamson Inc.<br>Tulsa, Okla. |

[54] HOT TAPPING APPARATUS
22 Claims, 11 Drawing Figs.

| [52] | U.S. Cl. | 137/318 |
|---|---|---|
| [51] | Int. Cl. | F16l 41/04 |
| [50] | Field of Search | 137/317,<br>318; 77/37—42; 102/24 HC |

[56] References Cited
UNITED STATES PATENTS

| 2,385,017 | 9/1945 | Mercier | 77/42 |
|---|---|---|---|
| 3,293,952 | 12/1966 | Fairbanks | 77/42 |
| 3,335,664 | 8/1967 | Enzian | 102/24 HC |
| 3,396,745 | 8/1968 | Bates | 137/317 |

*Primary Examiner*—M. Cary Nelson
*Assistant Examiner*—David R. Matthews
*Attorney*—Hyer, Eickenroht, Thompson & Turner ABSTRACT: Apparatus comprising a housing adapted to be connected to a pipeline for surrounding in fluidtight relation an area of the pipeline to be tapped and having an opening therein adapted to be connected with the opening to be formed in the pipeline. Each of one or more shaped charges is carried by a holder for disposal over the periphery of the area to be removed, and a fuse connecting with each charge extends exteriorly of the housing to permit the charge to be detonated in response to a signal from a remote location in order to cut the coupon from such area. A means is disposed entirely within the housing to withdraw the holder and the coupon into a portion of the housing removed from the path between the opening in the housing and the opening cut in the pipeline.

PATENTED AUG 17 1971 3,599,663

Burton Ver Nooy
INVENTOR.

BY Browning, Ayer, Eickenroht & Thompson
ATTORNEYS

Burton Ver Nooy
INVENTOR.

HOT TAPPING APPARATUS

This invention relates to improved apparatus for use in forming a side opening or "hot tap" in a pipeline or other pressure vessel. Openings formed in this manner are useful, for example, in establishing communication between the pipeline and another conduit, whereby fluid and/or solid objects may pass from one into the other.

In a conventional "hot tapping" machine, a cutter is carried by a boring bar which is mounted within a housing installed on the pipeline for rotary and reciprocable movement toward and away from the area of the pipeline to be tapped. Generally, the housing includes a valve which may be opened to admit the cutter and then closed, upon withdrawal of the cutter, to contain line pressure as the remainder of the housing is removed therefrom to permit the cutter to be used at another location.

The user of such a machine must manipulate various parts on its exterior for actuating the valve and boring bar in desired sequence. However, it is often desired to form such openings in pipelines at remote locations, such as deep beneath the water surface, where these manipulations are impractical, if not impossible.

Because of the high power requirements of the cutter in drilling through the pipeline, these earlier hot tapping machines have been large and heavy. Thus, they are not only expensive to manufacture, but also expensive to inventory, particularly in any practical range of sizes. Furthermore, they are very difficult to handle in large sizes, and may require the use of auxiliary lifting equipment, which of course further complicates their use at remote locations.

An object of this invention is to provide apparatus of this type which is especially well suited for use at such remote locations in that it requires no manual manipulation in and around such location.

Another object is to provide self-contained and automatically operable hot tapping apparatus in which the pipeline opening is formed by parts which are relatively small, light and inexpensive to manufacture, so that the apparatus is easy to install, even at a remote location, and further so that there is little to be lost by not retrieving such parts.

A further object is to provide apparatus of the character described above which is especially well adapted for use in establishing an unobstructed path between the opening to be formed in the pipeline and an opening in a side of the housing intermediate the pipeline and the end of the housing opposite the pipeline, or between such opening to be in the pipeline and an opening in the end of the housing opposite the pipeline, whereby objects may be passed from the housing opening into the pipeline opening.

These and other objects are accomplished, in accordance with the illustrated embodiments of the invention, by apparatus which comprises, as in prior apparatus of this type, a housing adapted to be connected to the pipeline for surrounding in fluidtight relation the area thereof to be tapped, and a means within the housing for cutting and removing a coupon from this area of the pipeline. However, in accordance with the novel aspects of the invention, the housing has an opening in it which is adapted to be connected with the side opening to be formed in the pipeline, and a means is provided for withdrawing the cutting means and coupon into the housing and out of the path between the opening in the housing and the side opening in the pipeline. More particularly, this means for so cutting the coupon and withdrawing the cutting means and the coupon is disposed entirely within the housing and is automatically operable in response to one or more signals from a location remote from the housing.

In one form of the invention, the housing opening is disposed in a side thereof intermediate the area of the pipeline from which the coupon is to be cut and the end of the housing opposite the pipeline. In this embodiment, the withdrawing means has means connectable to the coupon for moving the coupon to a position within the housing intermediate its opposite end and the opening in the side of the housing. In another form of the invention, the opening in the housing is in its end opposite the area of the pipeline from which the coupon is to be cut, and the withdrawing means has means connectable to the coupon for moving the coupon into a portion of the housing laterally offset from the path between the pipeline and housing openings. In still another form of the invention, in which the opening in the housing is also in its end opposite the pipeline, the coupon is withdrawn into a radially enlarged portion of the housing on a side of the pipeline removed from such path.

Preferably, the opening in the pipeline is formed by one or more shaped charged adapted to be disposed over and adjacent to the pipeline and a fuse extending from each charge to a location remote from the housing. More particularly, in the illustrated embodiments of the invention, each charge is carried by a holder or backup plate. In the first mentioned form of the invention, a stud is connected to the pipeline and extends through the holder, and an extendible and retractable member is connected at one end to the end of the housing and at the other end to the stud for withdrawing the holder with the coupon. In the second mentioned form of the invention, a similar holder for the shaped charge is connected to the housing for swinging from a position over the pipeline into a position within the offset portion of the housing for withdrawing both the coupon and holder into such portion. In the third mentioned form of the invention, there are holders for shaped charges disposable over the pipeline in lateral spaced relation, and means are provided for connecting each of the holders to the housing for withdrawing them into laterally enlarged portions of the housing and the coupon to the housing for withdrawing it into said radially enlarged portion of the housing.

In the drawings, wherein like reference characters are used throughout to designate like parts.

Figures 1, 2:
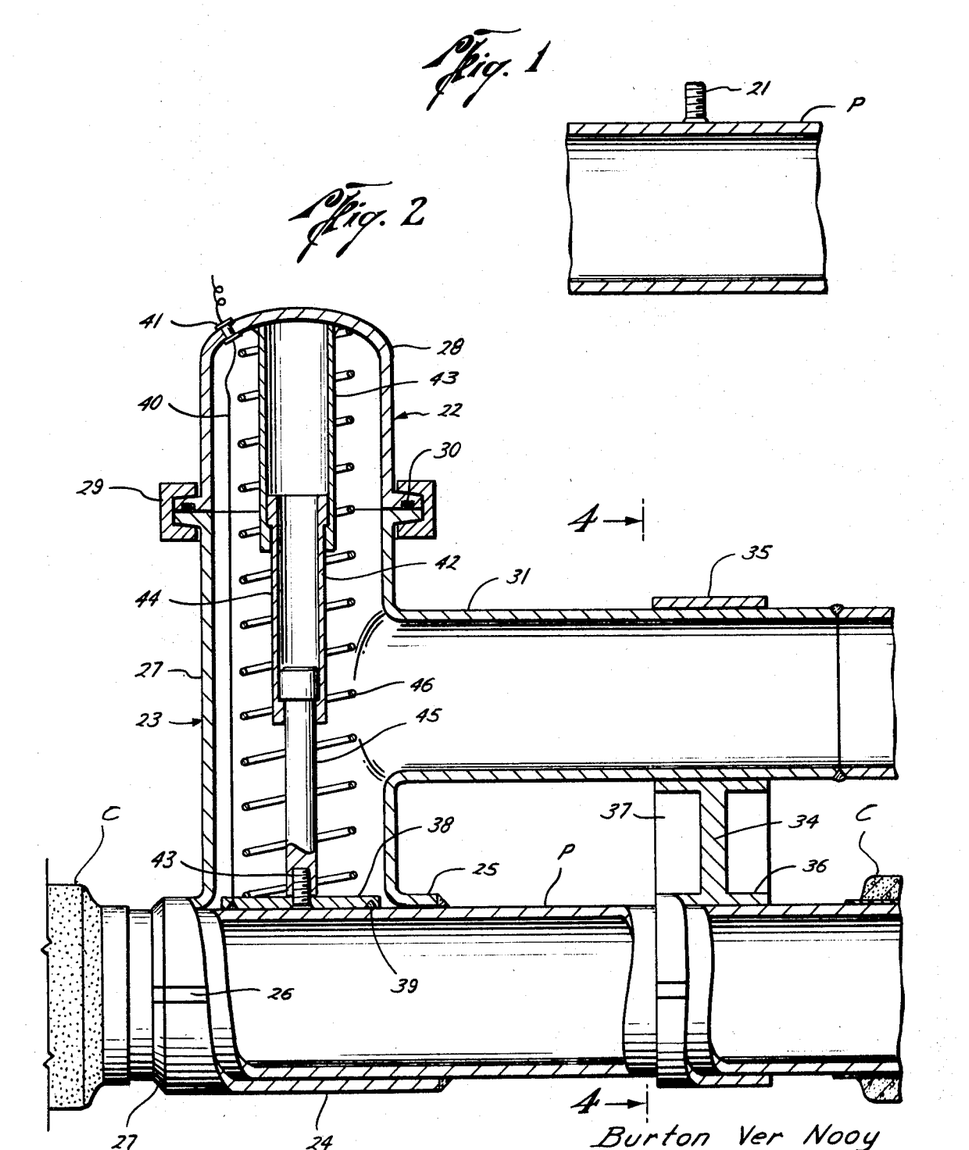
FIG. 1 is a longitudinal sectional view of a pipeline and a stud connected to the area thereof from which a coupon is to be cut.
FIG. 2 is a view, partly in section and partly in elevation, of one embodiment of the first described form of apparatus constructed in accordance with the present invention, and showing a shaped charge disposed over the stud prior to detonation of the charge.

With reference now to the details of the drawings, and particularly FIG. 1, the pipeline P, which may be underwater or at some other remote location, is first prepared for the installation of the various embodiments of apparatus illustrated in FIGS. 2 to 9 by the connection to the area thereof to be tapped of a threaded stud 21, and preferably in approximately the center of the coupon to be cut from it. As illustrated in FIG. 2, the pipeline P may be surrounded by a corrosion resistant coating C or the like, which is first removed to permit connection of the stud 21 thereto and installation of the hot tapping apparatus thereon.

Figure 3:
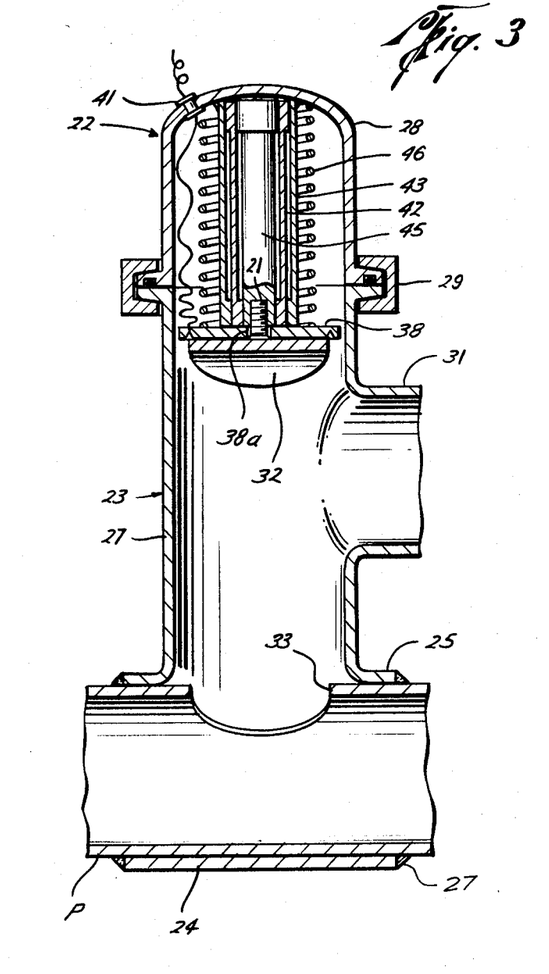
FIG. 3 is a partial sectional view of the apparatus of FIG. 2, but upon detonation of the shaped charge to cut the coupon and withdrawal of the coupon and holder.
Figure 4:
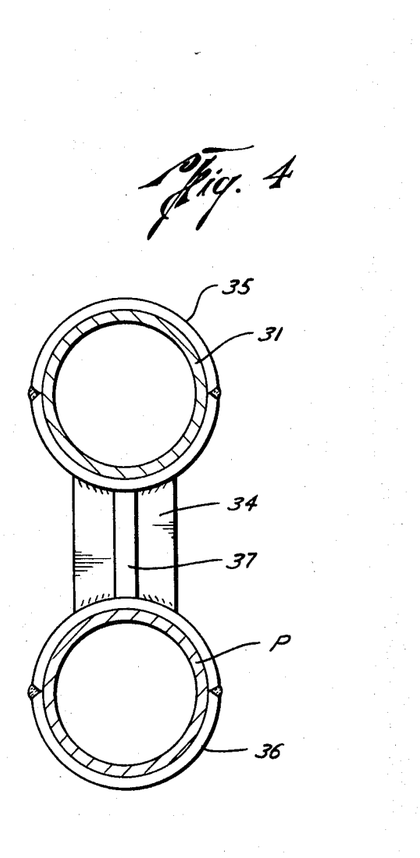
FIG. 4 is a cross-sectional view of a portion of the apparatus of FIGS. 2 and 3, as seen along broken line 4–4 of FIG. 2.

The embodiment of the apparatus illustrated in FIGS. 2 to 4 comprises a housing 22 including a tee 23 connected to the pipeline to surround the stud 21 and the area to be tapped in fluidtight relation. This tee includes a lower semicylindrical portion 24 adapted to fit closely about the lower half of the pipeline P and an upper semicylindrical portion 25 adapted to fit closely about the upper side of the pipeline. The tee portions 24 and 25 are welded together along their opposite edges, as indicated at 26, and are welded at their opposite ends to the pipeline, as indicated in 27.

The tee also includes a tubular branch 27 which extends upwardly from an opening in the upper portion 25 of the tee and is closed at its upper end opposite the area of the pipeline to be tapped by means of a cap 28 connected to the main portion of the branch by means of a clamp 29. A seal ring 30 is disposed between the flanges on the main portion and the cap of the branch so as to render the branch fluidtight.

The housing 22 also includes a tubular branch 31 extending outwardly from an opening in the side of the branch 27 of the tee and generally parallel to the pipeline P. In a manner to be described below, a coupon 32 is cut from the pipeline to form the opening 33 therein and is withdrawn with the stud 21 into the branch 27 above the side opening therein connecting with branch 31. As will be apparent from FIG. 3, this provides unobstructed path between the opening 33 in the pipeline and the side opening into the branch 31.

As shown in FIGS. 2 and 4, the branch 31 of the housing is rigidly connected to the pipeline by a brace 34, as is often specified in underwater pipelines in view of the possible movement of the pipeline due to settling or ocean currents. Thus, the brace is disposed a fairly substantial distance to one side of the connection of the tee 23 to the pipeline in order to keep additional stresses imposed by these relative movements from adding to the pressure induced stresses of the connection of the tee to the pipeline. As best shown in FIG. 4, the brace includes clamps 35 and 36 connected about the branch 31 and the pipeline, respectively, and a webbed strut 37 extending between the clamps. As shown in FIG. 2, the coating C has also been removed from the portion of the pipeline encircled by clamp 36.

As previously described, the coupon 32 is removed from the pipeline 20 by means of a shaped charge which is detonated within the fluidtight housing 23 while disposed about the stud 21 and over the area of such pipeline to be removed. Thus, as shown in FIG. 2, and preparatory to detonation, a holder 38 carrying a shaped charge 39 on its lower side is properly located over the pipeline by movement of a hole 38a through the holder over the stud 21. More particularly, the holder comprises an arcuate plate for closely fitting about the pipeline within the branch 27 of the housing and has a groove about its concave side which receives the shaped charge. The charge is detonated by means of a fuse 40 which extends upwardly through the branch 27 and exteriorly thereof through the fluidtight fitting 41, as shown in FIGS. 2 and 3.

Upon detonation of the shaped charge to cut the coupon 32, both the coupon and holder 38 are automatically withdrawn by means of an extendible and retractable rod 42 into the upper portion of the branch 27 above the connection of branch 31 therewith. The upper end of this rod is welded to the cap 28 of the branch 27, while the lower end of the rod has a socket 43 threaded onto the upper end of the stud 21 which projects through the hole in the holder 38. In this embodiment of the invention, the retractable rod comprises telescopically arranged rod sections 43, 44, and 45, with the lower and middle rod sections 45 and 44, respectively, having enlarged heads for limiting their extension from the sections 44 and 43 in which they are slidable.

As shown in FIG. 3, the rod sections 43, 44, and 45 are urged toward retracted positions, in which they telescope within one another, by means of a tension coil spring 46 surrounding the rod and connected at its upper end to the cap 28 of the branch 27 and at its lower end to the convex side of the holder 38. Thus, upon detonation of the shaped charge 39 to cut the coupon 32 from the pipeline, which may be responsive to a remote signal transmitted through the fuse 40, both the coupon and the holder 38 are retracted upwardly to the position of FIG. 3, wherein both are above the opening into branch 31 so as to provide the above-mentioned unobstructed path between such opening and the opening 33 formed in the pipeline.

Figure 5:
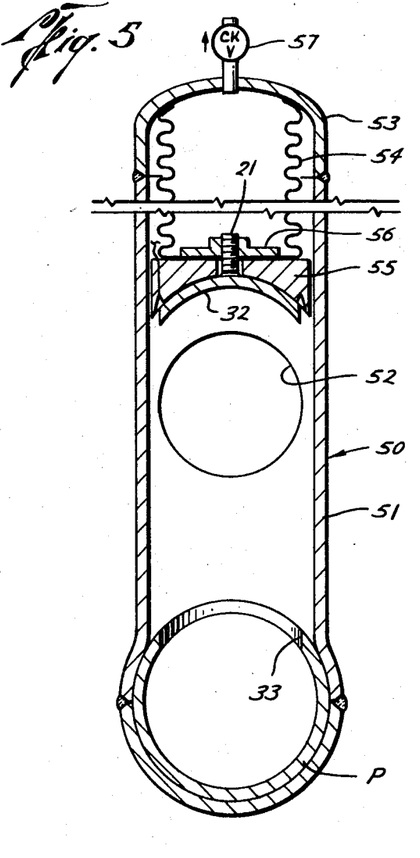
FIG. 5 is a view, partly in cross section and partly in elevation, of another embodiment of the first described form of apparatus constructed in accordance with this invention, and the coupon and shaped charge holder withdrawn, as in FIG. 3.

The embodiment of the invention illustrated in FIG. 5 is very similar to that of FIGS. 1 to 4 in that it also includes a housing 50 comprising a tee having a branch 51 extending upwardly from an opening in the upper portion of the tee which surrounds the area of the pipeline P to be tapped in fluidtight relation. The housing 50 also has a lateral branch (not shown) connecting with a side opening 52 in the branch 51 intermediate the opening to be formed in the pipeline and the upper end of the branch 51.

The upper end of the branch 51 includes a dome 53 welded to the main portion thereof, and a bellows 54 within such branch is secured at its upper end at the dome 53 and at its lower end to a holder 55 threaded over the stud 21 secured to the pipeline P. The top side of the holder 55 is flat, and the lower end of the bellows 54 has a fitting 56 for threaded connection over the upper end of the stud 21.

With the pressure within the bellows 54 less than the pressure within the pipeline, the coupon 32 and its holder 55 will be automatically withdrawn upon detonation of the shaped charge carried by the holder for cutting the coupon. That is, the differential between the line pressure and the pressure within the bellows acts over the area of the bellows defined by the connection of the bellows to the dome 53 to retract the bellows and thereby withdraw the coupon and its holder 58 into the upper end of branch 51 of the tee above opening 52. A check valve 57 connects the bellows with the exterior of the branch 27 for use in releasing pressure within the bellows in order to prevent expansion of the bellows, and thus lowering of the coupon, in the event of a drop in line pressure. Alternatively, the bellows could be designed to exceed its elastic limit upon retraction, so that it could subsequently expand only to a minor extent.

Figure 6:
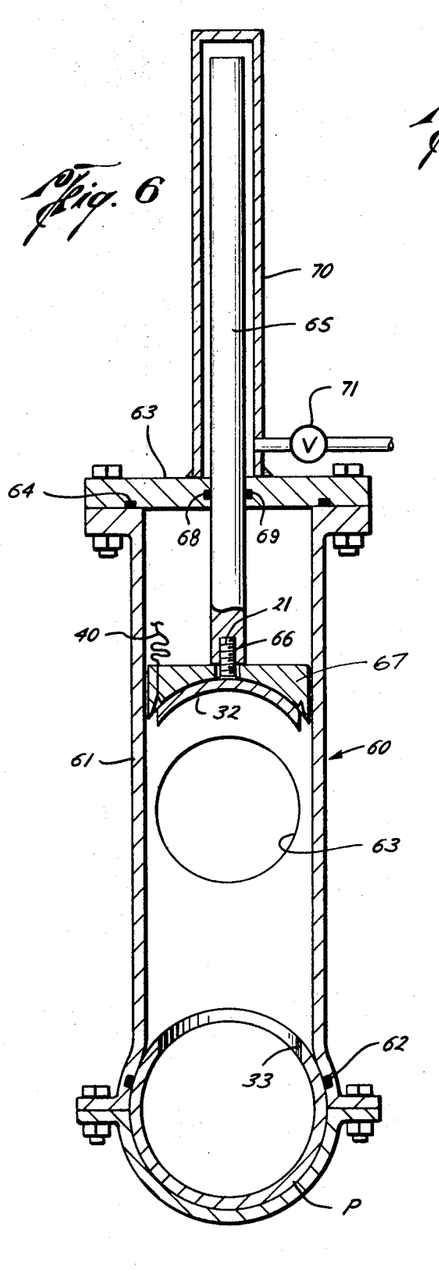
FIG. 6 is a cross-sectional view of still another embodiment of the first described form of apparatus constructed in accordance with the invention, and also showing a coupon and shaped charge holder withdrawn, as in FIGS. 3 and 5.

The embodiment of the apparatus shown in FIG. 6 is also similar to that of FIGS. 1 to 4 in that it includes a housing 60 comprising a tee having a branch 61 extending upwardly from an opening in the upper portion of the tee which surrounds the area of the pipeline P. In this particular embodiment, the upper and lower portions of the tee have flanges which are bolted together, as shown in FIG. 6, so as to not require welding, and an O-ring 62 is carried within a groove in the upper portion of the tee so as to surround the area of the pipeline to be tapped and thereby render it fluidtight. As in the case of the apparatus of FIGS. 1 to 4 and 5, the housing 60 of the apparatus of FIG. 6 also has a lateral branch, (not shown) connecting with a side opening 63 in the branch 61 intermediate the opening to be formed in the pipeline and the upper end of the branch 61.

This upper end of the branch 61 includes a head 63 bolted to a flange about the upper end of the main portion of the branch, and this connection is made fluidtight by an O-ring 64 between the head and flange. A rod 65 having a socket 66 at its lower end for threading over the upper end of the stud 21, which projects through an opening in a shaped charge holder 67, extends sealably and slidably through an O-ring 69 carried within a central opening 68 through the head 63. More particularly, the rod 65 is of sufficient length to extend through the head 63 when it is extended into the branch 61 for connection with the stud 21 on the pipeline prior to detonation of the charge.

Thus, assuming that the pressure acting over the outer end of the rod 65 is less than line pressure, the rod will automatically be retracted to withdraw the coupon 32 and holder 67 upon detonation of the charge to cut the coupon from the opening 33 of the pipeline. More particularly, the rod will be urged upwardly to withdraw the coupon and shaped charge holder above the opening 63 leading into the lateral branch of the housing.

As shown in FIG. 6, the outer end of the extendible and retractable rod 65 is surrounded by a fluidtight cylinder 70 welded at its lower end to the outer side of the head 63. This enclosure for the rod 65 prevents corrosion during long periods of use after installation of the apparatus. The chamber within the cylinder 70 may be evacuated or it may contain a gas at atmospheric pressure or at a desired pressure lower than that of line pressure. A valve 71 connects the interior of the cylinder 70 with the exterior thereof to vent the pressure within the cylinder to atmospheric pressure, in the event the cylinder is not charged with a pressure which is less than line pressure. Spring loaded hooks, locking clamps, or merely magnets on the upper end of the rod and cylinder 70 may be used to retain the rod in retracted position and thus maintain the coupon in its withdrawn position.

Figures 7, 8, 9:
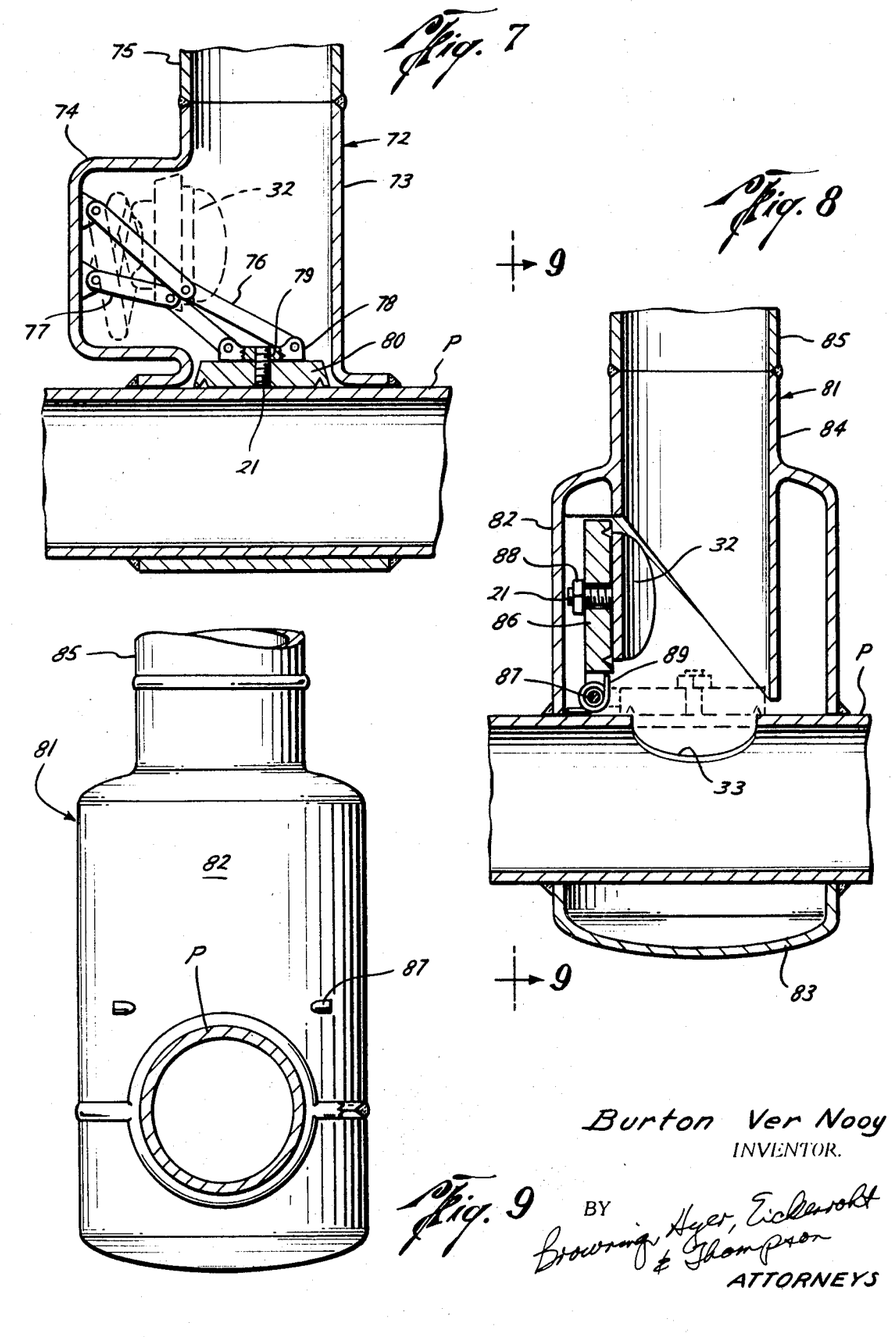
FIG. 7 is a longitudinal sectional view of one embodiment of the second described form of apparatus, and showing a shaped charge and its holder in solid lines while disposed over the area of the pipeline to be cut and in broken lines upon detonation of the charge and withdrawal of the coupon and holder into an offset portion of the housing.
FIG. 8 is a longitudinal sectional view of another embodiment of the second described form of apparatus, and showing the coupon and a shaped charge holder in solid lines upon withdrawal into an offset portion of the housing.
FIG. 9 is a side view of the apparatus of FIG. 8, as seen along broken line 9–9 of FIG. 8.

The housing 72 of the embodiment of the apparatus illustrated in FIG. 7 is similar to the housings of the previously described apparatus in that it includes a branch 73 extending upwardly from an opening in the upper portion of the tee connected to the pipeline P and surrounding the area of the pipeline to be tapped in fluidtight relation. However, as distinguished from the previously described apparatus, the branch 73 of the housing 72 includes a laterally offset portion 74 intermediate the lower end of the branch surrounding the area of the pipeline P to be tapped and the upper end thereof connecting with a conduit 75. Thus, upon cutting of a coupon from the pipeline and withdrawal of same along with a shaped charge holder into the offset portion 74, in a manner to be described to follow, the branch 73 provides an unobstructed path between the opening in the pipeline from which the coupon is removed and the conduit 75.

As shown in FIG. 7, links 76 and 77 are connected between the outer wall of offset portion 74 and a plate 78 having a threaded socket 79 for connection with the upper end of the stud 21 on the pipeline which projects above a hole through the shaped charge holder 80. More particularly, the links are pivotally connected to one another as well as to the offset portion of the branch 73 and the plate 78, so that, upon retraction of the links from the extended position shown in solid lines to the retracted position thereof shown in broken lines in FIG. 7, they are collapsed to withdraw the shaped charge holder 80 and coupon 32 into the offset portion 74. More particularly, the links are urged to their collapsed position by torsion springs (not shown) or the like, so that, upon detonation of the shaped charge carried by holder 80 for cutting the coupon 32, the coupon and holder are automatically withdrawn with the links into the offset portion.

As in the apparatus previously described, the embodiment of the apparatus illustrated in FIGS. 8 and 9 also comprises a housing 81 including a tee adapted to be connected to the pipeline P in fluidtight relation about the area thereof to be tapped. In this embodiment, however, the upper and lower portions 82 and 83 of the tee are cylinders of considerably greater diameter than the pipeline so that, when welded to one another and about the pipeline, as shown in FIGS. 8 and 9, they define portions on each lateral side and radially about the area of the pipeline to be tapped.

A branch 84 extends coaxially into the upper portion 82 of the tee and is of an inner diameter only somewhat larger than that of the coupon to be cut from the pipeline. The upper end of branch 84 is connected to a conduit 85 so that, with the coupon 32 withdrawn into a laterally enlarged portion of the tee, as shown in solid lines in FIG. 8, there is an unobstructed path between the opening 33 from which the coupon is removed and the opening in the housing connecting with the conduit 85.

As shown in FIG. 8, the lower end of the branch 84 is cut along a bias at an angle of approximately 45°, and a shaped charge holder 86 is pivotally connected by a pin 87 to the upper portion 82 of the tee on the side of the area of the pipeline to be tapped away from the lowermost end of the branch 84. More particularly, the pivot pin 87 is located within the laterally enlarged portion of the upper portion 82 of the tee so that the shaped charge holder 86 is swingable between the broken line and the solid line positions of FIG. 8. More particularly, the holder is connected to the upper end of the stud 21 projecting through a hole in the holder by means of a nut 88, and a torsion spring 89 is connected between the housing and the holder 86 for normally urging the holder to its solid line position. Thus, upon detonation of the charge carried by the holder 86 so as to cut the coupon 32, the coupon and holder are automatically withdrawn into the solid line position shown in FIG. 8, wherein they are out of the path between the conduit 85 and the opening 33.

As shown in FIG. 9, the outer ends of the pin 87 extend exteriorly of the housing so as to provide a visual indicator of the position of the shaped charge holder 86. This, of course, could be used to indicate whether or not the coupon has been cut and fully withdrawn. The ends of the pin 87 would, of course, extend through sealed openings (not shown) in the upper portion 82 of the tee.

The apparatus of FIGS. 8 and 9 may be used in passing spherical "pigs" between the pipeline and the conduit 85. In such a case, the inner diameter of each of the conduit 85 and branch 84 would be substantially the same as that of the pipeline. The inward extension of the branch 84 into the upper portion 82 of the tee, together with the concave side of the coupon 32 when withdrawn, as shown in FIG. 8, provides an essentially continuous conduit of uniform diameter for uninterrupted movement of the pig between the conduit and the pipeline.

Figure 10:
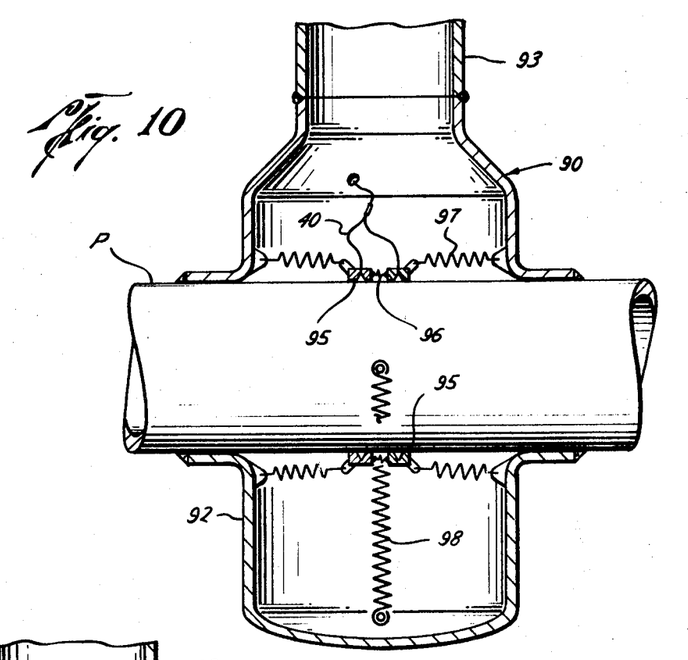
FIG. 10 is a longitudinal sectional view of an embodiment of the third described apparatus, with laterally spaced apart shaped charge holders in place about the pipeline for cutting a slot therein.
Figure 11:
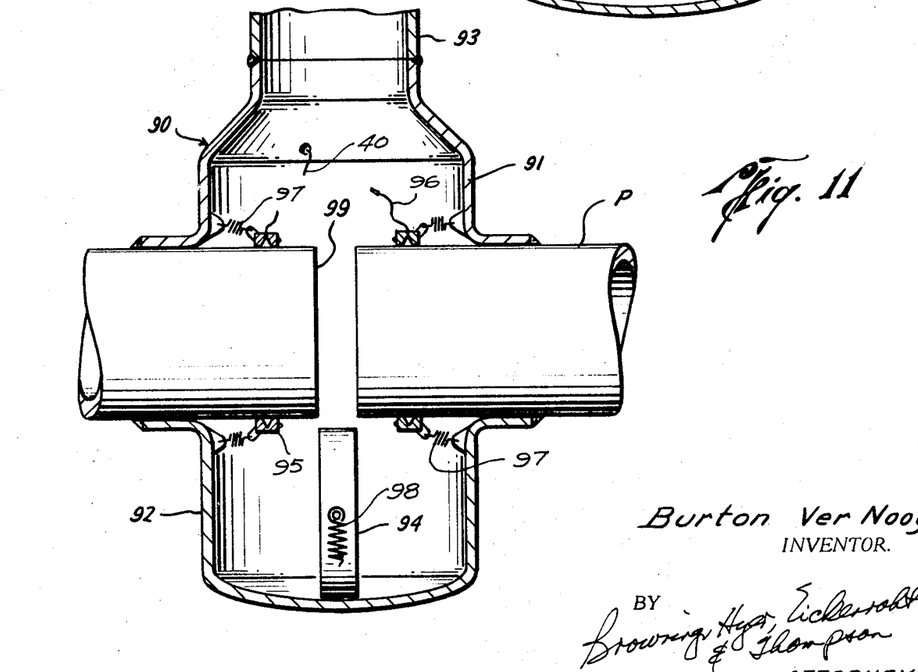
FIG. 11 is another longitudinal sectional view of the apparatus of FIG. 10, but upon detonation of the shaped charges and withdrawal of the coupon and holders into enlarged portions of the housing beneath and laterally of the opening cut in the pipeline.

Similarly to the apparatus of FIGS. 8 and 9, the embodiment of the apparatus illustrated in FIGS. 10 and 11 comprises a housing 90 including a tee made up of upper and lower cylinders 91 and 92, respectively, which are of considerably larger diameter than the pipeline and welded to one another and about the pipeline P so as to surround the area of the pipeline to be cut in fluidtight relation. Also, the upper end of tee portion 91 is reduced to connect with a conduit 93, so that, upon cutting of the coupon in a manner to be described, the coupon and the means for cutting it may be withdrawn into enlarged portions of the housing and thereby provide an unobstructed path between the opening in the pipeline and the opening into the conduit 93.

In this particular embodiment of the invention, a coupon is cut laterally across the pipeline, either as a full disc to form a slot across the pipeline, as indicated in FIG. 11, or as a partial disc to form a partial slot therein. Thus, there are a pair of shaped charge holders 95 each comprising a ring for surrounding one side edge of the coupon 94 to be cut from the pipeline. The rings closely surround the pipe and have grooves about their inner circumferences for carrying the shaped charge adjacent the pipeline wall. The holders 95 are normally connected together by frangible parts 96 and are caused to be properly spaced apart by means of tension springs 97 connected between them and the adjacent wall of the housing tee.

Detonation of the charge carried by the holders 95 will not only cut the pipeline to remove the coupon 94 therefrom and form opening 99 therein, but will also break the frangible parts 96 to permit the springs 97 to withdraw the holders 95 to the positions shown in FIG. 11 within laterally enlarged portions of the housing. Preferably, the coupon 94 is also positively withdrawn from within the slot 99 and into a radially enlarged portion of the housing by means of springs 98 connecting its opposite sides with a part on the lower portion 92 of the tee. In some cases, the coupon may be found to be of such weight as to fall to a withdrawn position by its own weight. In other cases, the coupon may be disintegrated upon detonation of the shaped charge. In any event, upon withdrawal of the coupon and the holders 95, there is an unobstructed path between the opening 99 from which the coupon has been removed and the lower end of the conduit 93.

The apparatus illustrated in FIGS. 10 to 11 may be especially useful in providing an opening into which a valve member may be moved for closing off the pipeline. In this event, the valve member would be carried on a part above the conduit 93 for movement toward the opening 99. This particular apparatus may also be used in tapping a pipeline through which spherical pigs are to be run, because the opening 99 is of sufficiently narrow width that the pipeline, even when tapped, provides a substantially continuous conduit for passage of the pig.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in forming an opening in a pipeline or the like, comprising a housing adapted to be connected to the pipeline for surrounding in fluidtight relation the area thereof to be tapped, said housing having an opening therein adapted to be connected with the side opening to be formed in the pipeline, means for cutting a coupon from said area, and means disposed entirely within the housing for withdrawing the coupon into and retaining it within the housing and out of the path between the opening in the housing and the opening in the pipeline.

2. Apparatus of the character defined in claim 1, wherein said withdrawing and retaining means includes means for connecting the coupon to be cut to the housing and automatically operable, upon cutting of the coupon, to so withdraw and retain the coupon.

3. Apparatus of the character defined in claim 2, wherein said coupon cutting means comprises at least one shaped charge for disposal over and adjacent the pipeline for cutting the coupon therefrom in response to detonation of the charge.

4. Apparatus of the character defined in claim 3, wherein the cutting means comprises an arcuate plate having the shaped charge carried on its concave side.

5. Apparatus of the character defined in claim 4, wherein said plate has a hole therethrough for disposal over a part on the coupon to be cut, and said connecting means includes means for connecting said part to said housing.

6. Apparatus of the character defined in claim 3, wherein the cutting means comprises a pair of arcuate members each having the shaped charge carried on its inner diameter for disposal over the pipeline in laterally spaced relation.

7. Apparatus of the character defined in claim 6, wherein said plates are connected to one another in side-by-side relation by means which is automatically releasable in response to said detonation, and said connecting means includes means for separately connecting each ring and the coupon to be cut to the housing.

8. Apparatus for use in forming an opening in a pipeline or the like, comprising a housing adapted to be connected to the pipeline for surrounding in fluidtight relation the area thereof to be tapped, said housing having an opening therein adapted to be connected with the side opening to be formed in the pipeline, means for cutting a coupon from said area, and means automatically operable, upon cutting of the coupon, for withdrawing the coupon into and retaining it within a position within the housing removed from the path between the opening in the housing and the opening in the pipeline.

9. Apparatus of the character defined in claim 8, wherein the housing includes a tee having one end adapted to surround the area of the pipeline to be tapped, and the opening in said housing is disposed in a side of the tee intermediate its end adapted to surround the pipeline and its opposite end, and said withdrawing and retaining means comprises a member which is extendible and retractable with respect to the opposite end of the tee and has means on one end for connection to said area so as to withdraw said coupon, upon cutting of same and retraction of said member, into a position within the tee intermediate its opposite end and said side opening.

10. Apparatus of the character defined in claim 9, wherein said coupon cutting means comprises a shaped charge for disposal over and adjacent the pipeline for cutting the coupon in response to detonation of the charge.

11. Apparatus of the character defined in claim 9, wherein the member comprises a retractable and extendible rod connected at one end to the opposite end of the tee, and said withdrawing means also includes spring means urging the rod to a retracted position.

12. Apparatus of the character defined in claim 9, wherein the member comprises a rod sealably reciprocable within said opposite end of the tee.

13. Apparatus of the character defined in claim 9, wherein said member comprises a bellows connected to and extending from the opposite end of the tee.

14. Apparatus of the character defined in claim 8, wherein the housing includes a tee providing the housing opening in one end thereof opposite the area of the pipeline to be tapped, and a portion laterally offset from the path intermediate said end and the area of the pipeline to be tapped, and said withdrawing and retaining means comprises means for connecting the coupon to be cut to said housing for movement into said offset portion upon cutting of the coupon.

15. Apparatus of the character defined in claim 14, wherein said coupon cutting means comprises a shaped charge for disposal over and adjacent the pipeline for cutting the coupon in response to detonation of the charge.

16. Apparatus of the character defined in claim 14, wherein said connecting means comprises linkage for connecting the coupon to said offset housing portion.

17. Apparatus of the character defined in claim 14, wherein said connecting means comprises a pivotal arm for connecting the coupon with said offset housing portion.

18. Apparatus of the character defined in claim 8, wherein the housing includes a tee providing the housing opening in one end thereof opposite the area of the pipeline to be tapped, and enlarged portions which are offset from the path intermediate said end and the area of the pipeline to be tapped, and said withdrawing and retaining means includes means for withdrawing said coupon into one of said enlarged portions.

19. Apparatus of the character defined in claim 18, wherein said cutting means comprises a pair of holders each carrying a shaped charge for disposal in side-by-side relation over and closely adjacent the pipeline for cutting the coupon in response to detonation of the charge, and said withdrawing and retaining means includes means for withdrawing said cutting means into other enlarged portions.

20. Apparatus for use in forming an opening in a pipeline or the like, comprising a housing adapted to be connected to the pipeline for surrounding in fluidtight relation the area thereof to be tapped, said housing having an opening therein adapted to be connected with the side opening to be formed in the pipe, and a portion laterally offset from the path intermediate the housing opening and the area of the pipeline to be tapped, means for cutting a coupon from said area and means for connecting the coupon to be cut to said housing to withdraw the coupon into said offset portion and removed from the path between the opening in the housing and the opening in the pipeline automatically in response to cutting of the coupon.

21. Apparatus of the character defined in claim 20, wherein said connecting means comprises an arm having means on one end for connection at its opposite end to said offset portion of the housing for swinging between a position between said offset portion and a position adjacent the coupon for connection thereto.

22. Apparatus of the character defined in claim 21, including spring means normally urging said pivotal arm to its position within the offset portion.